(No Model.)

J. F. BENNETT.
RIDING SADDLE.

No. 355,123. Patented Dec. 28, 1886.

WITNESSES:
Fred G. Dieterich
P. B. Turpin

INVENTOR:
J. F. Bennett
BY Munn & Co.
ATTORNEYS.

UNITED STATES PATENT OFFICE.

JOSEPH F. BENNETT, OF PELLVILLE, KENTUCKY.

RIDING-SADDLE.

SPECIFICATION forming part of Letters Patent No. 355,123, dated December 28, 1886.

Application filed October 5, 1886. Serial No. 215,406. (No model.)

*To all whom it may concern:*

Be it known that I, JOSEPH F. BENNETT, of Pellville, in the county of Hancock and State of Kentucky, have invented a new and useful Improvement in Riding-Saddles, of which the following is a specification.

My invention is an improved riding-saddle having springs to render the same easy to the rider; and the invention consists in certain features of construction and novel combinations of parts, as will be hereinafter described and claimed.

Figure 1:
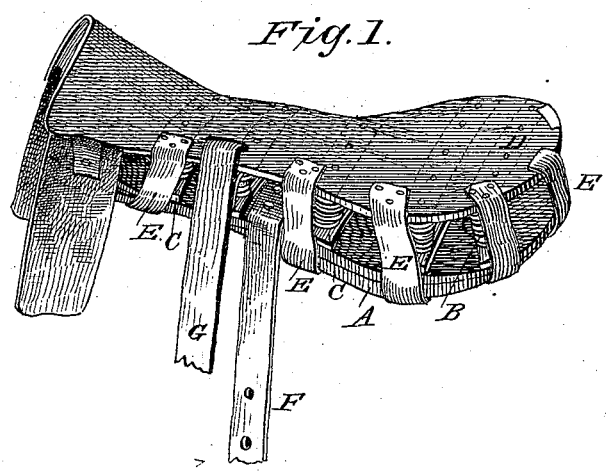
Figure 2:
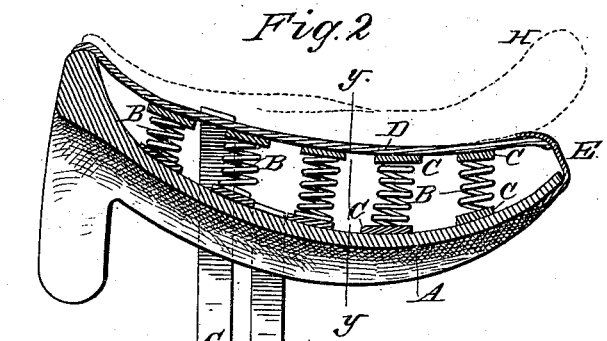
Figure 3:
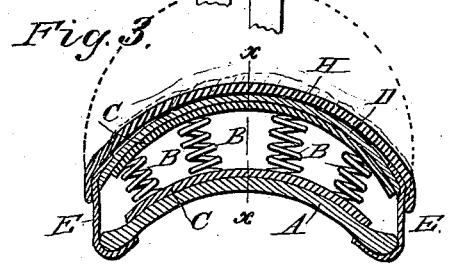

In the drawings, Figure 1 is a perspective view of my saddle-frame ready to receive the finishing-cover. Fig. 2 is a vertical longitudinal section of my saddle, and Fig. 3 is a cross-section of the completed saddle.

The tree A may be of any suitable form and material. The springs B are formed of wire coiled as shown, and a number of these springs are attached to two strips, C C, of leather, thus being divided into sets of springs, each set having a lower and upper strip of leather, the springs being secured to such strips by sewing or in other suitable manner. The lower strips are secured usually by tacking to the tree, and are arranged in parallel rows, as shown in Fig. 1.

In practice I usually make the springs at or near the center of the tree about two and one-half inches high, decreasing toward the front and back, where they are about one inch high. Over these springs I place a shield, D, of stout harness-leather, and this shield is connected at its forward end directly to the tree, while it is connected at its sides and rear edge to the tree by means of straps E, thus confining the springs in place and completing the saddle-frame.

I connect the girth F to the tree and the stirrup-straps G to the shield, thus providing for securing the saddle rigidly to the animal, and at the same time furnishing a yielding support for the stirrups, so the rider will have the advantage of the springs whether sitting in the saddle or standing in the stirrups.

To prevent the upper strips C from slipping out of place, they may be riveted to the shield, as shown in Fig. 1, or be stitched or secured thereto in other suitable manner, as may be desired.

In completing the saddle the cover H may be placed on the shield and secured, its edges extending half-way down between the shield and the tree, as shown in Fig. 3.

Where desired, the saddle may be upholstered and padded, as indicated in dotted lines in Fig. 2.

One riding my saddle with feet in the stirrups has the advantage of the springs whether sitting on the seat or standing in the stirrups, and can ride a rough-trotting horse with almost as much ease as if riding in a carriage. Manifestly any form of saddle-tree may be used, and either the ordinary saddle or the side-saddle for ladies' use.

The saddle may contain as many springs as required, the one now in use being provided with twenty springs.

In the use of the saddle air may circulate freely between the shield and the tree over the horse's back between the horse and rider, thus preventing galling or scalding the animal's back, and at the same time keeping the rider cool.

Having thus described my invention, what I claim as new is—

1. The combination of the tree, the strips C C, the springs secured between said strips, and the lower strip being secured to the tree, the shield placed on the upper strips C, the girth secured to the tree, and the stirrups connected with the shield, substantially as set forth.

2. The improved saddle, substantially as described and shown, consisting of the tree, the strips C C, the lower ones being secured to the tree, the springs secured between said strips, the shield, the straps E, connecting said shield and tree, the girth connected to the tree, the stirrup-straps connected with the shield, and the cover H, all substantially as and for the purposes specified.

The above specification of my invention signed by me in the presence of two subscribing witnesses.

JOSEPH F. BENNETT.

Witnesses:
P. B. TURPIN,
SOLON C. KEMON.